Jan. 26, 1960
A. L. BLOOM ET AL
2,922,947
GYROMAGNETIC RESONANCE APPARATUS
Filed March 29, 1954
3 Sheets-Sheet 1
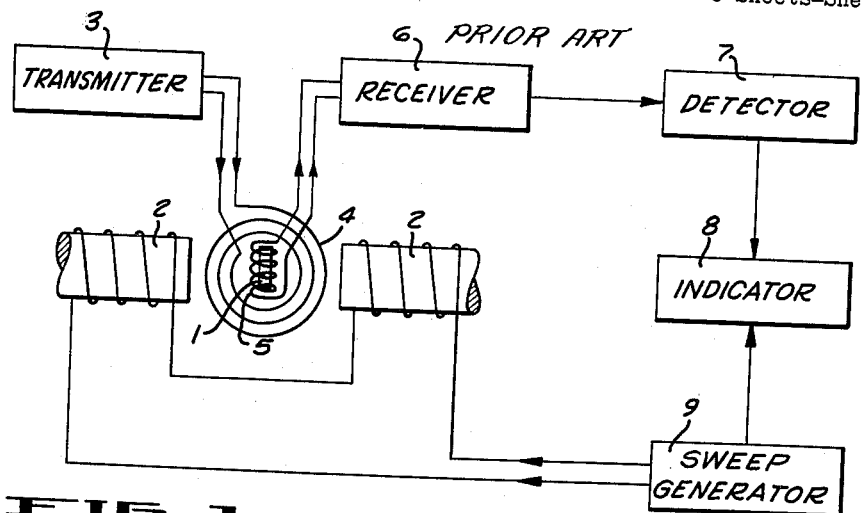
FIG_1 PRIOR ART
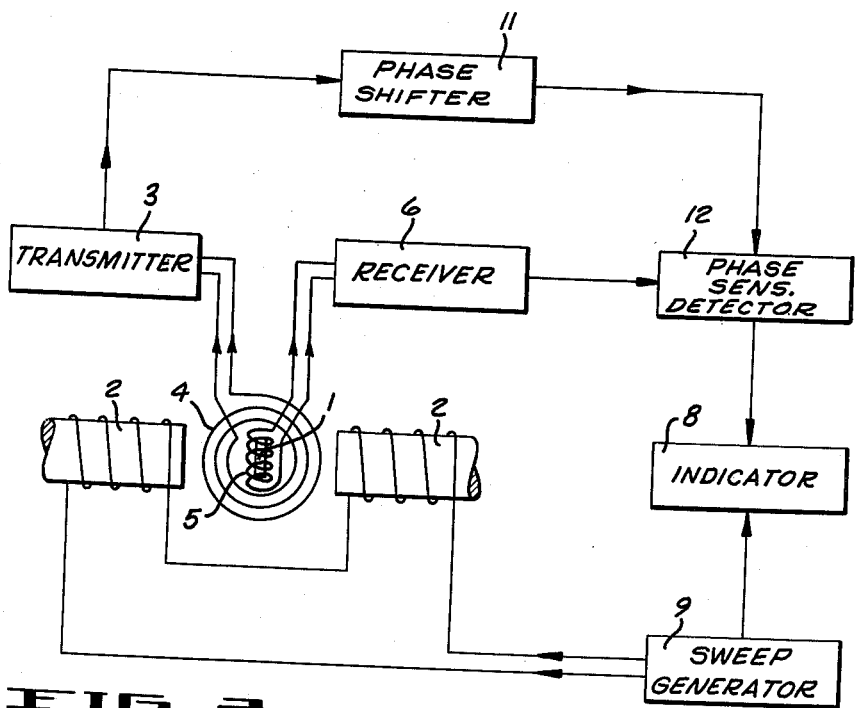
FIG_2
INVENTORS
ARNOLD L. BLOOM &
MARTIN E. PACKARD
BY
Paul B. Hunter
ATTORNEY

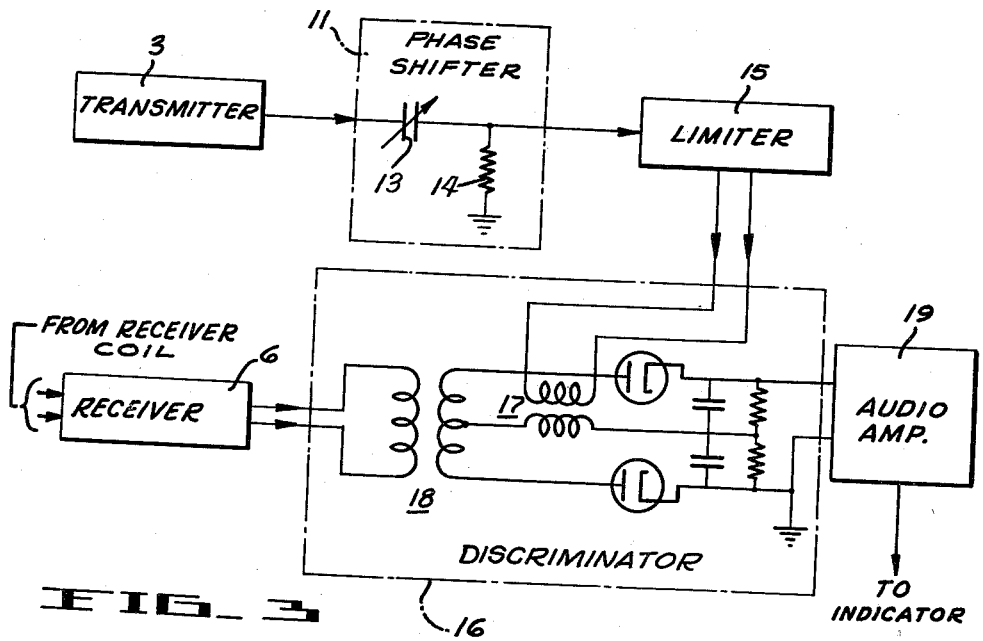
FIG_3
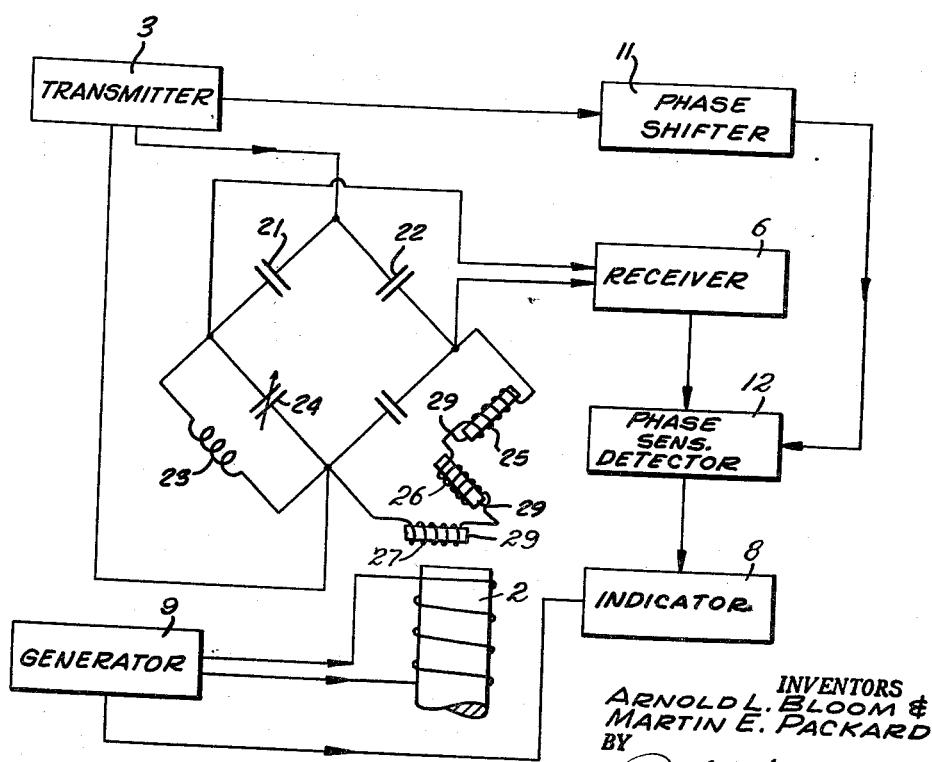
FIG_4

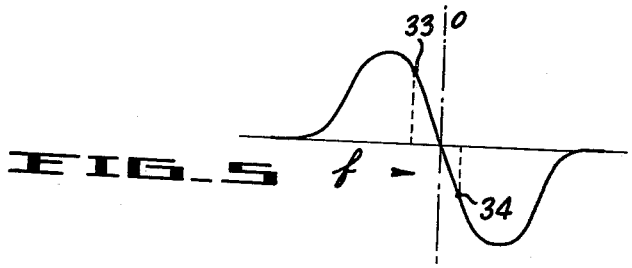
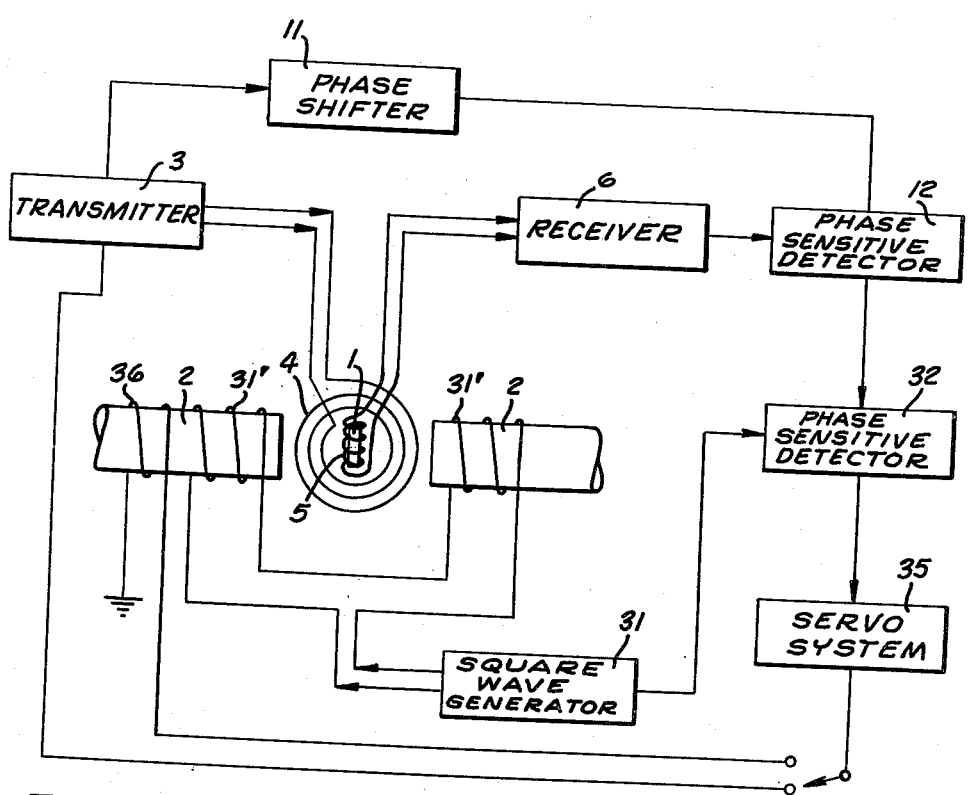
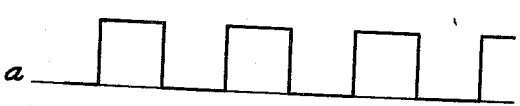
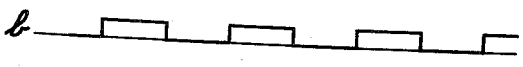
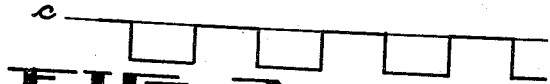

United States Patent Office

2,922,947
Patented Jan. 26, 1960

2,922,947

GYROMAGNETIC RESONANCE APPARATUS

Arnold L. Bloom, Los Altos, and Martin E. Packard, Menlo Park, Calif., assignors to Varian Associates, San Carlos, Calif., a corporation of California Application March 29, 1954, Serial No. 419,258

20 Claims. (Cl. 324—.5)

The present invention relates in general to improved apparatus and methods for utilizing the principle of gyromagnetic resonance, for example, nuclear resonance, and more particularly to such improvements directed toward effecting rapid and positive selection of the phase of the gyromagnetic resonance signal, elimination of divergence in results due to random changes in the direction of the polarizing magnetic field relative to the probe apparatus, and the utilization of square wave modulation of the polarizing field, when the output is the dispersion signal, in combination with a phase sensing apparatus to produce an output signal which has all the characteristics of an error signal, such that a servo system may utilize the error signal to control certain of the operations of the system.

This invention relates to the principle of gyromagnetic resonance which is set forth in U.S. Patent No. 2,561,489, issued July 24, 1951, to Felix Bloch et al. In this patent to Bloch there is an explanation of the part that the small leakage voltage between the mutually perpendicular transmitter coil and receiver coil plays in enabling the nuclear induction signal to be detected. The induced signal due to the gyromagnetic resonance has a component in-phase with the transmitter voltage and a component out-of-phase or in quadrature, the former component being referred to as the dispersion mode, or U-mode, and the latter component as the absorption mode, or V-mode. The leakage signal also has a component in-phase with the transmitter voltage and a component out-of-phase and, depending on which of these components was the much more dominant, the particular mode which was in-phase with this dominant leakage component was the dominant mode. In the apparatus heretofore employed, it was a difficult operation to select a desired one of these two modes to be received as the dominant component in the induced signal because of the difficulty of producing a desired dominant leakage component. Special apparatus was required in the probe to permit the balancing out of the undesired one of either of these two leakage signal components, as, for example, apparatus such as disclosed in U.S. patent application Serial No. 303,353 of Forrest A. Nelson, filed August 8, 1952. The present invention discloses a novel method and means for rapidly and conveniently selecting the mode of the induced signal desired as the dominant mode, either the absorption or dispersion mode.

In certain applications of the principle of gyromagnetic resonance, such as, for example, the measurement of the earth's magnetic field from a fast moving airplane by free precession where the earth's magnetic field is the magnetic field in which the nuclei precess, it is difficult to maintain the polarizing and receiver coils in a fixed direction relative to the earth's field. A gyroscopic system may be employed to maintain this rigid balanced relationship but this is a complicated and expensive solution. This invention discloses a novel method and apparatus for eliminating the need for such intricate balancing procedures by providing a novel gyromagnetic probe or sensing circuit comprising a plurality of separate, mutually perpendicular pickup coils with associated samples in place of the single pickup coil and sample, this probe being so arranged and connected that changes in the direction of the polarizing field or, in free precession work, the field in which the nuclei precess relative to the coils which will produce signal variations in certain of the coils will also produce balancing or offset variations in other of the coils to thereby maintain status quo.

As disclosed in the above cited Bloch patent and utilized in present day applications of this gyromagnetic resonance phenomenon, the polarizing magnetic field is modulated by an audio frequency sine or triangular wave of, say, 60 cycles whereby the magnetic field is swept back and forth through the point of resonance, the resonance signal gradually approaching a maximum and then decreasing again. This present invention discloses a novel method and apparatus whereby the modulating signal is a square wave rather than a sine wave. This square wave is so utilized that the point of resonance occurs during one-half cycle of the square wave and a point of no resonance occurs during the other half cycle. This square wave modulation and associated apparatus, when utilized with the gyromagnetic signal obtained in the dispersion mode, produces an output signal which is a square wave in which the height of the halves of the waves decreases as the point of resonance is approached, the square wave reducing to a straight line at the point of resonance. As the maximum resonance point is embarked from in the other direction, then the height of the square wave halves increases again, but this time in the opposite phase. Thus there is produced a very practical error signal which may be readily utilized by a servo-mechanism system for controlling the gyromagnetic resonance equipment so as to produce a continually balanced system such that the maximum resonance condition is always maintained.

A feature of the present invention is the provision of a novel gyromagnetic resonance system wherein an external reference signal such as may be obtained from the associated radio frequency transmitter is transmitted directly to a mixer in the receiver stage to which the resonance signal is also transmitted whereby the reference signal is mixed with the resonance signal in the mixer for rendering dominant a desired mode of the resonance signal.

Another feature of the present invention is the provision of a novel gyromagnetic probe apparatus wherein a plurality of mutually perpendicular receiver coils and associated plurality of gyromagnetic samples are arranged and connected such that regardless of the position the probe assumes relative to the polarizing magnetic field, the apparatus will function to produce gyromagnetic resonance signals.

Another feature of the present invention is the provision of a novel gyromagnetic resonance system wherein a square wave modulating signal is utilized to modulate the polarizing field such that the atom portions are in resonance half of the time and out of resonance the other half of the time, whereby the signal picked up by the receiver coil is a square wave envelope and, where working with the dispersion mode, swings about a base voltage such that, at resonance, the square wave shape has reduced to a straight line shape while on either side of resonance the square wave shape is produced but with differing phase, the height of the wave sections being dependent on the distance off resonance.

Other features and advantages of the present invention will become apparent from a perusal of the following specification taken in connection with the accompanying drawings wherein Fig. 1 is a block diagram of a type of gyromagnetic resonance system presently in common use, Fig. 2 is a block diagram of a novel gyromagnetic system of this present invention in which a phase shifter and a phase sensitive detector are utilized to provide a reference signal from the transmitter stage directly to the receiver stage of the system whereby selection of the desired resonance signal is accomplished, Fig. 3 is a circuit diagram of one particular electronic circuit which may be utilized as part of the system shown in Fig. 2, the circuit including the phase shifter and the phase sensitive detector and also a limiter circuit, Fig. 4 is a block diagram of a gyromagnetic resonance system wherein a novel probe is utilized having three mutually perpendicular receiver coils and three associated gyromagnetic samples in one arm of a balanced bridge type probe, whereby the system is rendered insensitive to changes in direction of the probe relative to the polarizing field, Fig. 5 shows the shape of the dispersion mode of the induced signal with magnitude plotted against frequency, the point of maximum resonance being denoted by the dotted line O.

Fig. 6 is a block diagram of a novel gyromagnetic resonance system wherein a square wave signal is utilized to modulate the polarizing magnetic field, whereby an output signal of the error signal type may be obtained from the system, such a signal being useful for driving a servo system to change the polarizing magnetic field or the frequency of the driving radio frequency to maintain a constant resonance, and Fig. 7 is the output signal before integration as obtained from a system such as shown in Fig. 6, the signal being shown in three stages, curve (a) showing the output signal when the system is off-resonance, curve (b) showing the output signal when the system is still off maximum resonance but is approaching close to resonance, and curve (c) showing the signal when the system is again appreciably off resonance, but this time in the opposite direction to that in curve (a).

Referring now to Fig. 1 there is shown a block diagram of a gyromagnetic resonance system of the type disclosed in the above cited Bloch patent. Briefly, the volume of matter 1 containing the gyromagnetic portions of atoms, such as nuclei, is located within a polarizing magnetic field produced between the pole faces of a magnet 2. A radio frequency driving signal is applied to the matter from a transmitter stage by means of a transmitter 3 and transmitter coil 4 surrounding the matter 1. When the magnetic field strength and the radio frequency are properly correlated, the portions of atoms precess in resonance with the applied radio frequency and produce an R.F. magnetic field which cuts a receiver coil 5, placed mutually perpendicular to both the polarizing field and the transmitter coil 4, thereby inducing an R.F. voltage therein. In addition to the signal induced in the receiver coil 5 by the precessing atom portions, there is an R.F. signal induced in the receiver coil 5 due directly to the R.F. signal in the transmitter coil 4. This is true even though the receiver and transmitter coils are positioned as close to being mutually perpendicular as is possible. This directly induced voltage is referred to as the leakage signal.

The total signal induced in the receiver coil 5, composed of the leakage signal and the resonance signal, is transmitted to a receiver 6 which includes an R.F. amplifier and is then transmitted to a detector 7, where the signal is demodulated and the envelope signal transmitted to a suitable indicator 8; in the above cited patent an oscilloscope was utilized. The coil 5, receiver 6, detector 7 and indicator 8 all form a part of the receiver stage, or means for detecting the resonance signal in this illustrative system. A sweep generator 9 was utilized to modulate the polarizing magnetic field with a 60 cycle sweep to thus cause the point of resonance to be periodically swept through. This audio sweep voltage was also transmitted to the horizontal plates of the oscilloscope to synchronize the scope with the sweeping field.

The leakage signal induced in the receiver coil 5 is composed of a component in-phase with the transmitter coil voltage and a component in quadrature. The induced signal due to the precessing atom portions or nuclei also has an in-phase and a quadrature component as described above. Whether the dispersion or absorption mode of the observed depends on the dominant component of the leakage signal since the leakage signal is so very much larger than the gyromagnetic induction signal. This leakage signal may be balanced by means of tuning circuits consisting of paddles and resistance and reactance circuits such as set forth in the above cited patent application to Forrest A. Nelson so that the in-phase and out-of-phase components may be selectively increased and decreased relative to one another as desired. In this manner, the operator may select the mode of the induced signal to be received. In practice, this balancing technique is a delicate and tedious operation and requires the attention of an operator with extensive experience.

The present invention as set forth in one embodiment in block diagram in Fig. 2 introduces a novel method and means for rapidly selecting the mode of the induced resonance signal which may be accomplished by an operator with little experience. Elements in Fig. 2 and the remaining figures similar to like elements in preceding figures bear the same reference numerals. In this embodiment a portion of the radio frequency signal from the transmitter stage is transmitted to a phase shifter network 11 where the phase of this signal may be advanced or delayed by a screw adjustment or the like. This phase adjusted signal is then transmitted to a phase sensitive detector 12 in the receiver stage. The signal induced in the receiver coil 5 composed of the induced resonance signal and the leakage signal, which leakage signal is small now compared to the phase adjusted or reference signal, is also transmitted through the receiver 6 to the phase sensitive detector 12 where it is mixed with the reference signal. The phase of the large reference signal is selectively adjusted so that it is either in phase with the U-mode component of the induced signal or with the V-mode component, as desired by the operator. Assuming for this explanation that the dispersion or U-mode is the one desired, the phase shifter 11 would be so adjusted that the reference voltage is in phase with the U-mode component and, in such case, the output of the phase sensitive detector 12 is an envelope voltage which takes the form shown in Fig. 5. Thus it is apparent that the mode of the output signal may be rapidly and conveniently selected without the intricate probe balancing previously utilized.

Of course, if a zero phase shift is desired between the transmitter 3 and the reference signal input of the detector 12, the phase shifter 11 may be by-passed or even dispensed with providing the leads directly coupling the transmitter 3 and detector 12 are maintained as short as possible. However, a variable phase shift device is desirable for flexibility in most applications.

There is shown in Fig. 3 a circuit diagram of one particular circuit which may be utilized in the system shown in Fig. 2. The phase shifter 11 is of a well known type which comprises a tunable condenser 13 and a resistor 14, the output of the phase shifter being transmitted to a limiter 15 of conventional design. The limiter 15 is utilized to give a constant amplitude output regardless of any random fluctuation in input or power supply. The output of the limiter 15 is coupled to a discriminator 16 through transformer 17 while the signal induced in the receiver coil is also transmitted to the discriminator through transformer 18. The envelope signal output from the discriminator is then transmitted to a D.C. or audio amplifier stage 19 where it is amplified and transmitted to an indicator as desired. The discriminator 16 and phase sensitive detector 12 may be broadly referred to as mixer circuits in which two input signals are mixed to give an output signal.

In many instances of practical applications of this gyromagnetic resonance phenomenon it will be extremely difficult to maintain the sensing probe fixed with relation to the polarizing magnetic field, in forced gyromagnetic resonance work, or the field in which the atom portions precess, in free precession work, as is more easily accomplished in precise laboratory experiments where the coils and fields are maintained mutually perpendicular.

For example, in a known free precession method utilized in geophysical prospecting for measuring the earth's magnetic field in which the nuclei precess after the nuclei are first momentarily polarized by a pulse of polarizing magnetic field produced at an angle to the earth's field, the probe including associated coils is carried in an airplane or in a bird towed by the airplane. When utilizing the free precession crossed-coil method, separate polarizing and receiver coils are used and are positioned mutually perpendicular, both being held as perpendicular to the earth's field as possible. When utilizing the single coil method, one coil serves as both the polarizing and detector coil as is well known in the art, this coil being held perpendicular to the earth's field. Under such present methods for measuring the earth's magnetic field it is necessary that the bird or airplane remain in a level flight so that the particular coils utilized are always properly positioned with respect to the earth's magnetic field. It is obvious that this is an extremely difficult condition to meet in practice since the airplane must necessarily bank and turn and is also buffeted about in such random manner.

The present invention discloses a novel probe structure which eliminates the necessity for maintaining a strict fixed physical relationship between the polarizing magnetic field, in forced gyromagnetic resonance work, or the magnetic field in which the atom portions precess, in free precession work, and the probe coils. The novel probe structure is shown embodied in a bridge circuit of a type which is presently in use in nuclear resonance work utilizing forced gyromagnetic resonance. The bridge circuit of the type commonly used in the art has two coils, one in each arm of a bridge circuit. Both coils are located in the polarizing magnetic field but only one of these coils has an associated volume of gyromagnetic matter. The bridge is adjusted so that it is balanced when the atom portions or nuclei in the sample are off resonance. At resonance, the energy in the coil associated with the gyromagnetic matter is different from that in the other coil and therefore the bridge is unbalanced at resonance, thus producing an output resonance signal. One embodiment of the novel probe of the present invention is shown in Fig. 4 in a forced nuclear resonance system employing a driving radio frequency transmitter and a bridge type detector circuit. The condensers 21 and 22 form two arms of the bridge, the coil 23 and its associated tuning condenser 24 forming the balancing arm in the bridge. The single coil which has the gyromagnetic matter associated therewith which formed the remaining arm is replaced by three mutually perpendicular coils 25, 26 and 27 all having their own associated like volumes of matter 29, the coils being connected in series but otherwise being decoupled from each other. The signal in this arm of the bridge will then be the sum of the signals in each of the three coils 25, 26 and 27. The polarizing magnetic field is shown as being produced by a magnet 2, only one pole of which is shown in Fig. 4. It should be understood that although the novel probe is shown in a forced nuclear resonance system in Fig. 4, this probe is equally adapted, as stated above, to free precession work in which the measured magnetic field could be that of the earth. Let $\alpha_1$, $\alpha_2$, and $\alpha_3$ be the respective angles between the polarizing magnetic field and the axes of the respective coils in Fig. 4. Then the signal is proportional to $$\sin^2 \alpha_1 + \sin^2 \alpha_2 + \sin^2 \alpha_3 = (1-\cos^2 \alpha_1) + (1-\cos^2 \alpha_2)(1-\cos^2 \alpha_3) = 2$$

since the sums of the squares of the direction cosines is equal to one. Thus, irrespective of the direction of the polarizing field relative to the three coils 25, 26 and 27, the signal will always be equal to the maximum signal that can be produced by two of the three volumes of matter. Since the signal is, for any direction, equivalent to the signal produced by two of the three volumes, each volume may be at least half the size of the sample used in the previously employed single-coil bridge system, other factors being equal.

With this novel coil configuration, regardless of the position of the coils 25, 26 and 27 relative to the polarizing magnetic field, the induced signal will not be affected by any relative tilt of the polarizing magnetic field. Any changes in one or more coil segments of this probe due to a change in the relative direction of the polarizing magnetic field will be compensated by an equal and balancing change in another one or more of the coil segments.

In gyromagnetic resonance systems in current use it is oftentimes desirable to maintain the apparatus so operating that maximum resonance is always maintained regardless of fluctuations in magnetic fields, power supplies and other operating conditions which would produce drifting from such maximum condition. Under such circumstances a servo system would be aptly suited for maintaining a balance at all times if a suitable error signal were present. There is disclosed in Fig. 6 a novel method and apparatus for utilization with gyromagnetic resonance apparatus for obtaining such an error signal.

Referring to Fig. 6 there is shown a gyromagnetic resonance system which includes a square wave generator 31 which is utilized for modulating the polarizing field. This square wave generator 31 transmits a square wave to the modulating coils 31' associated with the polarizing magnetic field to cause the field to periodically change between two different magnitudes of strength. The system is so adjusted that, at one particular value of strength, maximum gyromagnetic resonance is produced while during the other half of the square wave the system is completely off resonance. Therefore the output from the receiver coil 5 is composed of a leakage signal plus the gyromagnetic induction signal half of the time and only the leakage signal the other half. The phase shifting or adjusting circuit 11 and phase sensitive detector 12 are adjusted as described above to select the dispersion mode. By referring to the curve of the dispersion mode in Fig. 5 it can be seen that at maximum resonance the signal is reduced to zero while on either side of maximum resonance the signal increases or decreases to some maximum value and then decreases or increases again as we go further away from the maximum resonance point. The output from the phase sensitive detector 12 is a square wave voltage representing the envelope of the induced resonance signal, the magnitude of which is proportional to the amount the system is off resonance and the phase of which is dependent on the direction in which the system is off resonance. This may be better visualized by referring to Fig. 7 where there is disclosed the output from the phase sensitive detector circuit 12 in which curve (a) discloses the output at a time when the system is operating at the point of resonance denoted by reference numeral 33 on the dispersion curve of Fig. 5. As the point of maximum resonance, represented by dotted line O in Fig. 5, is approached from the point 33, the output resonance signal decreases to zero at resonance and likewise the output from the detector 12 decreases to a straight line curve, curve (b) showing the output at some point of resonance between point 33 and maximum resonance. As the point of maximum resonance is embarked from in the other direction, towards the point represented by reference numeral 34, the magnitude of the square wave output increases again but this time in the opposite phase with respect to the curve (a). The output from the detector 12 is transmitted to a second phase sensitive detector 32 as is the reference square wave signal from the square wave generator 31. The output from the second phase sensitive detector is a D.C. voltage, the magnitude of which is proportional to the magnitude of the square wave output of the phase sensitive detector 12 and the sign of which is dependent on the phase of the square wave output from detector 12 relative to the reference square wave signal. There is thus obtained an error signal, the magnitude of which is proportional to the amount which the system is off resonance and the sign of which is proportional to the direction in which the resonance is off. This error signal may then be transmitted to a servo system 35 of conventional design which comprises the necessary servo amplifiers, motors, rate circuits, etc. This servo may be coupled to the regulating coil 36 on one pole of the magnet 2 so as to control the strength of the polarizing magnetic field or it may be coupled to the transmitter 3 to control the frequency of the transmitter signal so that adjustment of either of these factors is made in the proper direction to offset the drift from maximum resonance and to thus maintain the system always at a maximum resonance condition.

Since many changes could be made in the above construction of the novel gyromagnetic resonance system and many apparently widely different embodiments of this invention could be made without departing from the scope thereof it is intended that all matter contained in the above description or shown in the accompanying drawings shall be interpreted as illustrative and not in a limiting sense.

What is claimed is:

1. In a gyromagnetic resonance system wherein resonance is produced between precessing portions of atoms possessing the properties of magnetic moment and gyroscopic moment located in a polarizing magnetic field and a radio frequency magnetic field applied to the atom portions at an angle to said polarizing magnetic field, the combination of transmitter means for supplying the radio frequency magnetic field energy to the atom portions to cause said portions to precess in said polarizing field, receiver means coupled to said atom portions for amplifying the resonance signal produced as a result of said precessing portions, said resonance signal including a component in phase with said transmitter radio frequency and a component out of phase, a mixer circuit coupled to the output of said receiver means, and means for supplying a reference radio frequency signal to said mixer of the same frequency as the transmitter frequency and phase related with respect thereto whereby one of the components of said resonance signal may be rendered dominant.

2. In a gyromagnetic resonance system wherein resonance is produced between precessing portions of atoms possessing the properties of magnetic moment and gyroscopic moment located in a polarizing magnetic field and a radio frequency magnetic field applied to the atom portions at an angle to said polarizing magnetic field, the combination of transmitter means for supplying the radio frequency magnetic field energy to the atom portions to cause said portions to precess in said polarizing field, means including a receiver coupled to said atom portions for amplifying the resonance signal produced by said precessing portions and a mixer circuit coupled to the output of said receiver and receiving said resonance signal therefrom, and means for transmitting to said detector a reference radio frequency signal which is frequency-related to the radio frequency in the transmitter means and which is phase related with respect thereto whereby said reference signal serves in the detector to render a desired component of the received resonance signal dominant.

3. In a gyromagnetic resonance system wherein resonance is produced between precessing portions of atoms possessing the properties of gyroscopic moment and magnetic moment located in a polarizing magnetic field and a radio frequency magnetic field applied to the atom portions at an angle to said polarizing magnetic field, the combination of transmitter means for supplying the radio frequency magnetic field energy to the atom portions, receiver means including a receiver coupled to the atom portions for detecting the resonance signal produced by said precessing portions and a mixer circuit coupled to the output of said receiver, and means including a phase shifter circuit for coupling said transmitter means to said mixer circuit whereby a signal from the transmitter to the mixer which is frequency related and phase related to the radio frequency signal in the transmitter serves to render dominant in the mixer a desired component of the output signal transmitted to the mixer from the receiver.

4. In a gyromagnetic resonance system wherein resonance is produced between precessing portions of atoms possessing the properties of magnetic moment and gyroscopic moment and an applied radio frequency magnetic field energy, the combination of means for producing a unidirectional magnetic field for polarizing said atom portions, transmitter means adapted to be coupled to said atom portions for supplying said radio frequency energy to said portions at an angle to said polarizing magnetic field to cause said portions to precess in the polarizing field at resonance with said applied radio frequency field, means including a receiver adapted to be coupled to said atom portions for amplifying the resonance signal and a mixer circuit coupled to the output of said receiver for receiving the radio frequency signal, a phase shifter network coupled to the transmitter means, the output of the phase shifter being coupled to the mixer circuit whereby a radio frequency signal which is frequency-related to the frequency in the transmitter and with controllable phase relative to the signal in the transmitter may be transmitted to the mixer for selecting a desired component of the received resonance signal, and indicator means coupled to the output of said mixer circuit.

5. In a gyromagnetic resonance system wherein resonance is produced between precessing portions of atoms possessing the properties of magnetic moment and gyroscopic moment located in a polarizing field and a radio frequency magnetic field source, the combination of means for supplying the radio frequency magnetic field energy to the atom portions at an angle to said polarizing magnetic field to thereby cause said portions to precess in said field at said resonance frequency, and means for detecting said precession comprising a plurality of coils positioned mutually perpendicular to each other and connected in series, each coil having a separate volume of said atom portions associated therewith, each coil being inductively coupled to the atom portions of its associated volume and having a voltage induced therein due to the precession of the magnetic moments of the atom portions in its associated volume.

6. Apparatus for use in a gyromagnetic resonance system comprising a plurality of coils positioned mutually perpendicular to each other and connected in series, each coil having a separate volume of matter associated therewith, said matter comprising portions of atoms having the properties of magnetic moment and gyroscopic moment, each coil being inductively coupled to the atom portions of its associated volume of matter, and terminals on said serially connected coils for coupling electrical energy to said coils.

7. In a gyromagnetic resonance system wherein resonance is produced between precessing portions of atoms possessing the properties of gyroscopic moment and magnetic moment located in a polarizing magnetic field and a radio frequency magnetic field applied to said atom portions at an angle to said polarizing magnetic field which comprises a plurality of volumes of matter containing said portions of atoms, a plurality of coils equal in number to said plurality of volumes positioned mutually perpendicular and connected in series, each coil being electromagnetically coupled to a separate one of the plurality of volumes of matter, said serially connected coils forming one arm of a bridge circuit, transmitter means for supplying the radio frequency magnetic field energy to the bridge circuit to cause the atom portions in each separate volume to precess at the resonance frequency to thereby unbalance the bridge circuit, and receiver means coupled to the bridge circuit for detecting said unbalance.

8. A gyromagnetic resonance system wherein resonance is produced between precessing portions of atoms possessing the properties of gyroscopic moment and magnetic moment located in a polarizing magnetic field and a radio frequency magnetic field applied to said atom portions at an angle to said polarizing magnetic field which comprises three volumes of matter containing said portions of atoms, three coils positioned mutually perpendicular and connected in series, each coil being inductively coupled to a separate one of the three volumes of matter, said serially connected coils forming one arm of a bridge circuit, transmitter means for supplying the radio frequency magnetic field energy to the bridge circuit to cause the atom portions in each separate volume to precess at the resonance frequency to thereby unbalance the bridge circuit at resonance, and receiver means coupled to the bridge circuit for detecting said unbalance.

9. In a gyromagnetic resonance system wherein resonance is produced between the frequency of precession of portions of atoms possessing the properties of magnetic moment and gyroscopic moment and a radio frequency magnetic field energy applied to the atom portions, the combination of means for producing a polarizing field enveloping the atom portions, means for supplying said radio frequency magnetic field energy to said atom portions at an angle to the direction of said polarizing magnetic field to cause said portions to precess in said polarizing field at said resonance frequency, generator means coupled to said field producing means for supplying a square wave to modulate the polarizing field to thereby cause said resonance to occur during only one-half of each square wave cycle, receiver means for picking up the resonance signal from said precessing atom portions, and means for coupling said square wave generator to said receiver means whereby a voltage output may be obtained from the system in which the magnitude of the output is proportional to the degree that the frequency of the received signal varies from the frequency of the maximum resonance signal and the sign of which is dependent on whether the received signal has a frequency higher or lower than the frequency of maximum resonance.

10. In combination with the gyromagnetic resonance system claimed in claim 9, a servo mechanism system coupled to the output of said gyromagnetic resonance system, said servo system utilizing the output voltage signal to control the operation of the gyromagnetic resonance system.

11. In a gyromagnetic resonance system wherein resonance is produced between the frequency of precession of portions of atoms possessing the properties of magnetic moment and gyroscopic moment and a radio frequency magnetic field energy applied to the atom portions, means for producing a polarizing magnetic field enveloping the atom portions, means for supplying said radio frequency magnetic field energy to said atom portions at an angle to said polarizing field, receiver means for picking up the radio frequency energy produced by the precession of said atom portions, generator means for supplying a square wave voltage to modulate the polarizing magnetic field to thereby cause said resonance to occur during only one-half of each square wave cycle, first detector means coupled to said receiver for providing an envelope voltage of the received radio frequency signal, second detector means coupled to first detector means and to said generator means whereby a direct current voltage output is obtained from the second detector means, the magnitude of which is dependent on the degree that the frequency of the received signal varies from the frequency of the maximum resonance signal and the sign of which is dependent on whether the received signal has a frequency higher or lower than the frequency of maximum resonance.

12. In a gyromagnetic resonance system wherein resonance is produced between the frequency of precession of portions of atoms possessing the properties of magnetic moment and gyroscopic moment and a radio frequency magnetic field energy applied to the atom portions, the combination of means for producing a polarizing magnetic field enveloping the atom portions, transmitter means for supplying said radio frequency magnetic field energy to said atom portions, receiver means for picking up the radio frequency signal produced by the precessing atom portions, a first phase sensitive detector circuit coupled to the output of said receiver means, means including a phase-shifter network coupling the transmitter to the first detector whereby said pick-up signal is selected as to components by the phase controlled transmitter signal, generator means for supplying a square wave voltage to modulate the polarizing magnetic field whereby periodic resonance is produced, a second phase sensitive detector circuit coupled to the output of said first detector and to the square wave generator, the output of said second phase sensitive detector being a direct current voltage, the magnitude of which is dependent on the degree that the frequency of the received signal varies from the frequency of the maximum resonance signal and the sign of which is dependent on whether the received signal has a frequency higher or lower than the frequency of maximum resonance.

13. In combination with the gyromagnetic resonance system claimed in claim 12, a servo mechanism system coupled to the output of said second phase sensitive detector, said servo system acting responsive to the direct current voltage output to control the operation of the gyromagnetic resonance system.

14. A combination as claimed in claim 13 including means for coupling said servo system to said transmitter means to variably control the transmitter frequency.

15. A combination as claimed in claim 13 including means for coupling said servo system to said polarizing field means to variably control the polarizing field.

16. Gyromagnetic resonance apparatus comprising a plurality of coils positioned mutually perpendicular to each other and connected in series, each coil having a volume of matter associated therewith, said matter comprising portions of atoms having the properties of magnetic moment and gyroscopic moment, each coil being inductively coupled to the atom portions of its associated volume of matter, said coils adapted to be positioned in a polarizing magnetic field, means for supplying electrical energy to said coils for causing said atom portions to precess gyromagnetically in said polarizing magnetic field, and means for detecting the gyromagnetic precession of said atom portions in said field.

17. Gyromagnetic resonance apparatus wherein gyromagnetic resonance of atom portions possessing the properties of magnetic moment and gyroscopic moment may be produced and detected which comprises means for producing a magnetic field for polarizing said atom portions, means for supplying driving radio frequency magnetic field energy to said atom portions to produce gyromagnetic resonance of the atom portions in the polarizing magnetic field, said energy supplying means comprising a plurality of coils positioned mutually perpendicular to each other and connected in series, each coil having a volume of matter including said portions of atoms associated therewith, said coils being inductively coupled to the atom portions of its associated volume of matter, means for detecting the resonance signal resulting from the gyromagnetic resonance of the atom portions, and means for supplying a reference radio frequency energy to said detecting means which is frequency-related to the driving radio frequency field and with controllable phase relative thereto whereby one of the phase components of the detected resonance signal may be rendered dominant.

18. Gyromagnetic resonance apparatus wherein gyromagnetic resonance of atom portions possessing the properties of magnetic moment and gyroscopic moment may be produced and detected which comprises means for producing a magnetic field for polarizing said atom portions, means for supplying driving radio frequency magnetic field energy to said atom portions to produce gyromagnetic resonance of the atom portions in the polarizing magnetic field, said energy supplying means comprising a plurality of coils positioned mutually perpendicular to each other and connected in series, each coil having a volume of matter including said portions of atoms associated therewith, said coils being inductively coupled to the atom portions of its associated volume of matter, generator means coupled to said field producing means for supplying a square wave to modulate the polarizing field to thereby cause said resonance to occur periodically during only one-half of each square wave cycle, means for detecting the resonance signal resulting from the gyromagnetic resonance of the atom portions, means for supplying a reference radio frequency energy to said detecting means which is frequency-related to the driving radio frequency field and with controllable phase relative thereto whereby one of the components of the detected resonance signal may be rendered dominant, and means for coupling said square wave generator to said detecting means whereby a voltage output may be obtained from the detecting means in which the magnitude of the output is proportional to the degree that the frequency of the received signal varies from the frequency of the maximum resonance signal and the sign of which is dependent on whether the received signal has a frequency higher or lower than the frequency of maximum resonance.

19. Apparatus wherein gyromagnetic resonance of atom portions possessing the properties of magnetic moment and gyroscopic moment may be produced and detected which comprises means for producing a magnetic field for polarizing said atom portions, means for supplying driving radio frequency magnetic field energy to said atom portions to produce gyromagnetic resonance of the atom portions in the polarizing magnetic field, said energy supplying means comprising a plurality of coils positioned mutually perpendicular to each other and connected in series, each coil having a volume of matter including said portions of atoms associated therewith, said coils being inductively coupled to the atom portions of its associated volume of matter, generator means coupled to said field producing means for supplying a square wave to modulate the polarizing field to thereby cause said resonance to occur periodically during only one-half of each square wave cycle, means for detecting the resonance signal resulting from the gyromagnetic resonance of the atom portions comprising a receiver for amplifying the resonance signal, a first phase sensitive detector circuit coupled to the output of said receiver, means including a phase shifter network coupling the transmitter to the first phase detector for supplying a reference radio frequency energy to said first detector which is frequency-related to the radio frequency in the transmitter and with controllable phase relative thereto whereby one of the components of the detected resonance signal may be rendered dominant, and a second phase sensitive detector circuit coupled to the output of said first detector and to the square wave generator, the output of said second phase sensitive detector being a direct current voltage, the magnitude of which is proportional to the degree that the frequency of the received signal varies from the frequency of the maximum resonance signal and the sign of which is dependent on whether the received signal has a frequency higher or lower than the frequency of maximum resonance.

20. A sensing head for use in the detection of gyromagnetically precessing atom portions in magnetic fields which comprises a plurality of electrical coils positioned mutually perpendicular to each other and connected in series, each coil being electromagnetically coupled to matter containing said gyromagnetic atom portions, said portions of atoms having properties of magnetic moment and being capable of precessing in magnetic fields in response to electromagnetic field energy applied to said matter and terminals on said serially connected coils for coupling electromagnetic energy from said coils due to said precessing atom portions.

References Cited in the file of this patent

UNITED STATES PATENTS

| | | |
|---|---|---|
| 2,561,489 | Bloch et al. | July 24, 1951 |
| 2,589,494 | Hershberger | Mar. 18, 1952 |

OTHER REFERENCES

Packard: Review of Scientific Instruments, vol. 19, No. 7, July 1948, pp. 435–439.

Levinthal: Physical Review, vol. 78, No. 3, pp. 204–213, May 1, 1950.

Andrew: Nuclear Magnetic Resonance, published 1955 by Cambridge Press.